United States Patent [19]
Shimirak et al.

[11] Patent Number: 5,449,299
[45] Date of Patent: Sep. 12, 1995

[54] TELECOMMUNICATIONS TERMINAL

[75] Inventors: Gerald L. Shimirak, Redwood City; Gail J. Bingham, Menlo Park; Miguel A. Morales, Fremont; Ruben P. Ramirez, Modesto, all of Calif.

[73] Assignee: Raychem Corporation, Menlo Park, Calif.

[21] Appl. No.: 358,052

[22] Filed: Dec. 16, 1994

Related U.S. Application Data

[63] Continuation of Ser. No. 186,056, Jan. 24, 1994, abandoned.

[51] Int. Cl.[6] ............................................. H01R 4/24
[52] U.S. Cl. ................................... 439/417; 439/676; 439/928
[58] Field of Search ................. 439/65, 76, 404, 389, 439/409, 411, 417, 425, 676, 597, 692, 928

[56] References Cited

U.S. PATENT DOCUMENTS

| | | | |
|---|---|---|---|
| 3,333,225 | 7/1967 | McNutt | 439/692 X |
| 3,895,266 | 7/1975 | Geiger | 439/631 |
| 4,127,312 | 11/1978 | Fleischhacker et al. | 439/404 X |
| 4,820,192 | 4/1989 | Denkmann et al. | 439/404 |
| 4,904,210 | 2/1990 | Gristescu et al. | 439/676 |
| 5,049,088 | 9/1991 | Rishworth et al. | 439/417 |
| 5,096,437 | 3/1992 | Levy | 439/411 |
| 5,153,988 | 10/1992 | Mattis et al. | 439/597 |
| 5,178,558 | 1/1993 | Knox et al. | 439/404 |
| 5,281,163 | 1/1994 | Knox et al. | 439/404 |
| 5,314,350 | 5/1994 | Matthews et al. | 439/404 |

FOREIGN PATENT DOCUMENTS

| | | | |
|---|---|---|---|
| 484243 | 5/1992 | European Pat. Off. | 439/404 |
| 217872 | 8/1989 | Japan | 439/676 |
| 91/16738 | 10/1991 | WIPO | 439/411 |

*Primary Examiner*—William Briggs
*Attorney, Agent, or Firm*—Herbert G. Burkard; William D. Zahrt, II; A. Stephen Zavell

[57] ABSTRACT

A modular, re-enterable telecommunications terminal (50), for making and breaking connections with insulated wire conductors, includes one or more base frames (52) supporting wire termination modules (55, 56) thereon, and a multi-pin socket (60) thereon is connected to another base froze (52) by one or more bridging modules (100). The termination modules (55, 56) are manually operable for terminating wires in insulation displacing connectors (70, 85), and are selected and positioned according to the type of terminations desired. Manually pushing and pulling the termination module drivers (65, 80) toward and away from the base frames (52) effects movement of the wires between connected and open positions.

23 Claims, 21 Drawing Sheets

TELECOMMUNICATIONS TERMINAL

This application is a continuation of application Ser. No. 08/186,056, filed 24 Jan. 1994 abandoned.

BACKGROUND OF THE INVENTION

The present invention relates to telecommunications terminals, and more particularly to a versatile modular connector and terminal system especially well adapted for use as a network interface device (NID), as a single-pair station protector (18½-24 gauge), as a large and small gauge cross-connection box (X-Box), as a field-terminated terminal (site term), as a stub cable terminal, and like applications. The modular features of the invention facilitate economical customization of these terminal systems with features such as over-voltage and over-current protection, active electronics, and so forth, as desired.

In the telecommunications industry, there is continual tension between the need for ruggedness, versatility, and performance, and the need for simplicity and economy. Common terminal systems are most often single-application designs, optimized for their intended single applications. This leads to the obvious proliferation of configurations, one for each of the various situations regularly encountered in the field.

Other, more flexible terminal systems have been proposed from time to time which can be configured selectively for a plurality of situations. Unfortunately, this versatility sometimes comes at the expense of complexity. With complexity comes increased manufacturing expense and greater vulnerability to failure.

A need therefore remains for high performance telecommunication terminal methods and apparatus which are at once versatile and rugged, uncomplicated and reliable, economical, and flexibly adaptable to the greatest range of telecommunications terminal needs.

SUMMARY OF THE INVENTION

Briefly, the present invention meets the above needs and purposes with a new and improved, modular, tool-less (manually operable), re-enterable telecommunications terminal for making and breaking connections with insulated wire conductors. The terminal of the present invention has the same footprint and same housings for all terminations, employing a minimum of standardized part configurations which are then multiplied in appropriate combinations for the needs at hand.

In its preferred embodiment, the terminal is a modular, re-enterable telecommunications terminal for making and breaking connections with insulated wire conductors, and includes a pair of base frames which are juxtaposed at their backs to one another. The base frames are substantially the same, each having provisions for receiving several wire termination modules, preferably four, along the front side of the base frame. Along the back side of the base frame is a multi-pin socket, preferably five pin (two tip, two ring, and one ground). Circuitry (such as a printed circuit board) is contained in the base frame for connecting the socket to one or more wire terminating modules attached to the base frame.

According to the needs at hand, one of several tool-less wire termination modules may be selected and installed on the base frame. One such module, for example, is a wide-gauge tower capable of re-enterably manually terminating insulated wire conductors ranging from 18½ gauge copper-coated steel to 24 gauge solid copper. Another such module is a small-gauge thimble module capable of re-enterably manually terminating insulated wire conductors ranging from 22 to 24 gauge solid copper. In the preferred embodiment, the wide-gauge tower is illustratively used for terminating telecommunications drop wire coming from a telephone company's central office, and the thimble module, which includes bridging capability, is for the inside wire going to the customer premises.

Each such module is supported on the module receiving means of the base frame. The module includes an insulation displacing connector (IDC) extending outwardly from the base frame and having an entry opening for receiving such insulated wire conductors, a manually operable push-pull driver module surrounding the insulation displacing connector, guides supporting the driver module around the insulation displacing connector for push-pull motion between open and connected positions relative to the IDC, and one or more passageways in the driver module for passing the insulated wire conductors thereinto and moving the conductors into and out of the IDC's through the entry openings therein when the driver module is manually moved to the connected and open positions, respectively. The driver modules also contain environmental sealant therein, preferably a gel, for environmentally sealing the insulation displacing connectors inside the driver modules. Finally, the terminal includes one or more bridging modules which are configured for electrically connecting the multi-pin socket to another such socket on another such base frame when juxtaposed thereto.

The bridging module may be passive, or may include active circuitry such as over voltage and/or overcurrent protection devices, maintenance test units (MTU's), amplifiers, and so forth, as desired. Thus, according to the selection of wire termination modules and bridging modules, a modular, re-enterable telecommunications terminal may be configured simply and economically for a great variety of the most common interconnection requirements.

It is therefore an object of the present invention to provide a new and improved modular, tool-less, re-enterable telecommunications terminal for making and breaking connections with insulated wire conductors, the terminal having a base frame which includes module receiving means for receiving wire termination modules, a multi-pin socket on the base frame, and means for electrically connecting modules in the module receiving means to the socket; the telecommunications terminal also having at least one tool-less wire termination module supported on the module receiving means; the wire termination module including an insulation displacing connector extending outwardly from the base frame and having means defining an entry opening for receiving such an insulated wire conductor, a manually operable push-pull driver module surrounding the insulation displacing connector, guide means supporting the driver module around the insulation displacing connector for push-pull motion between open and connected positions relative to the insulation displacing connector, means defining a passageway in the driver module for passing such an insulated wire conductor into the driver module and moving the wire conductor into and out of the insulation displacing connector through the entry opening therein when the driver module is moved, respectively, to the connected and the open positions, and environmental sealant in the driver module for environmentally sealing the insulation displacing connector in the driver module; and the telecommunications terminal also having at least one bridging module configured for electrically connecting the multi-pin socket to another such multi-pin socket on another such base frame when juxtaposed thereto; and wherein the telecommunications terminal may have a tool-less wire termination module which is a wide-gauge tower capable of re-enterably manually terminating insulated wire conductors ranging from 18½ gauge copper-coated steel to 24 gauge solid copper; wherein the environmental sealant may be a gel; wherein the tower may have a visual wire indicator therein for visually confirming receipt through the driver module passageway of such an insulated wire conductor; wherein the manually operable push-pull driver module may include a finger cap on the end thereof opposite the base frame for facilitating gripping the driver by means of fingers to manually pull the driver to the open position; wherein the guide means may be I-beam guide tracks supported in the module receiving means and corresponding I-beam guide slots in the wide-gauge tower, the guide slots receiving the guide tracks therein; wherein the tool-less wire termination module may alternatively be a small-gauge thimble capable of re-enterably manually terminating insulated wire conductors ranging from 22 to 24 gauge solid copper; wherein the driver module and the insulation displacing connector may include multi-wire bridging means; wherein the driver module may include a tactile indicator for indicating when the driver has been moved to the connected position; wherein the tactile indicator may be a snap locking connector for securing the driver in the connected position when moved thereto; wherein the snap locking connector may be a slot and tab latch having a finger squeeze latch release; wherein the insulation displacing connector may include a wire trim cut-off blade positioned inside the driver for intercepting and cutting off excess insulated wire extending through the driver module passageway when the driver is moved from the open to the connected position; wherein the bridging module may be substantially rigid and thereby also provide for mechanically coupling the base frame to another such base frame; wherein the bridging module may include electrical protection means connected for responding to condition faults at the socket such as over-voltage or over-current conditions; wherein the bridging module may include a gel-sealed RJ-11 test module connected thereto for testing electrical signals at the socket; wherein the bridging module may include active electrical circuit means connected for processing signals between the pins on the socket and other pins on another such socket; wherein the bridging module may include a gel seal for environmentally sealing the module to the base frame; wherein the terminal may include a metallic mounting bolt in the base frame connected for mounting the frame to a metallic housing and for electrically grounding the base frame thereto, the bolt having a pin socket in the head thereof, and the pin socket being positioned to provide a ground pin socket portion for the multi-pin socket; and to accomplish the above objects and purposes in an inexpensive, uncomplicated, durable, versatile, and reliable method and apparatus, inexpensive to manufacture, and readily suited to the widest possible utilization in the telecommunications industry.

These and other objects and advantages of the invention will be apparent from the following description, the accompanying drawings, and the appended claims.

DESCRIPTION OF THE PREFERRED EMBODIMENTS

Figure 1:
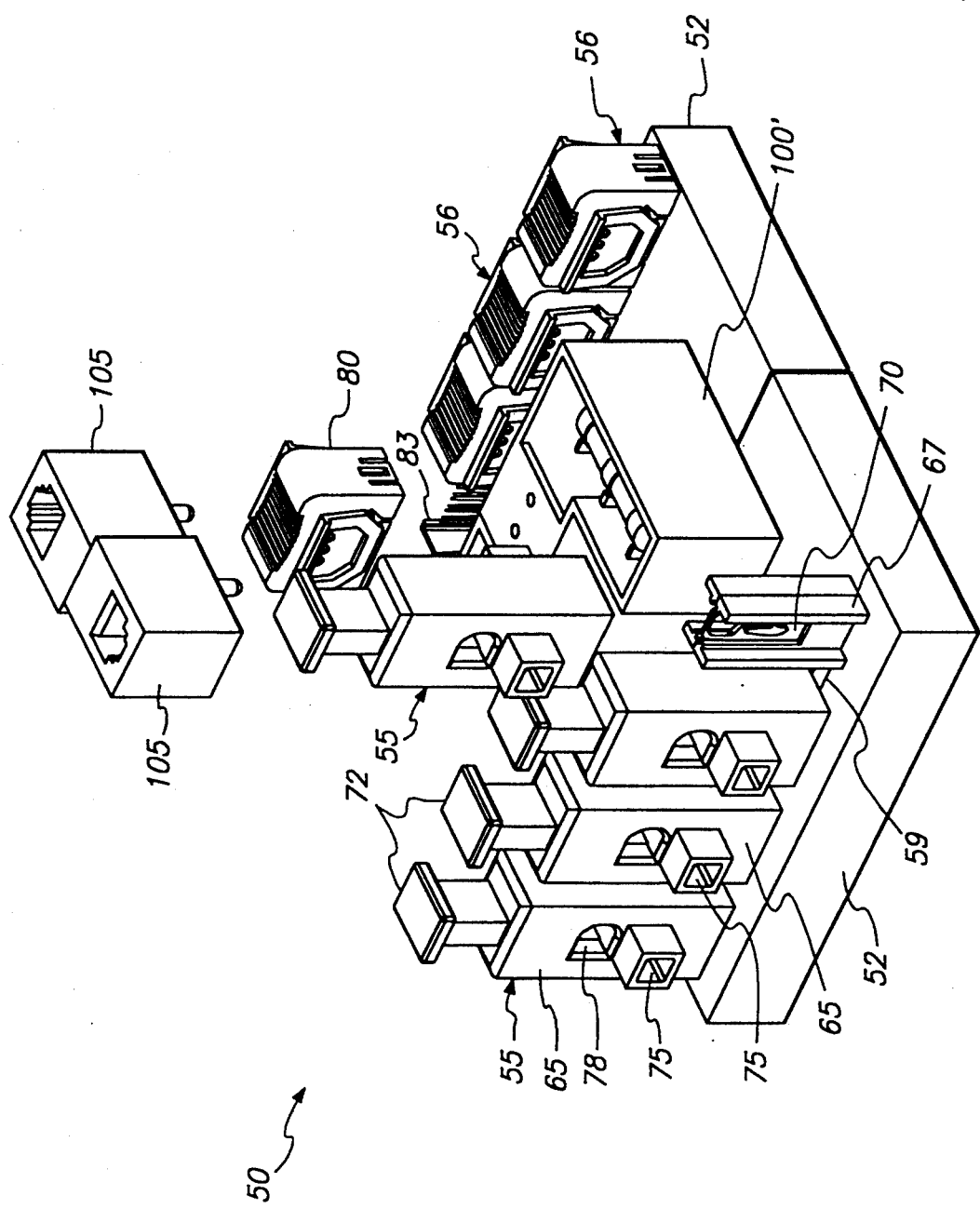
FIG. 1 is an isometric, partially exploded illustration showing a complete terminal in accordance with the invention, configured as a network interface device, but with the module covers removed to show components therein.

With reference to the drawings, the new and improved modular, tool-less (manually operable), re-enterable telecommunications terminal, and the methods therefor according to the present invention, will now be described. FIG. 1 shows an embodiment of the present invention in which the components thereof are configured as a network interface device. More particularly, the terminal 50 of the present invention includes one or more base frames 52 supporting one of several wire termination modules such as a wide-gauge tower 55 or a small-gauge thimble termination module 56.

These modules are received on base frame 52 and supported therein through openings 59 (see FIG. 29) therein, as appropriate.

Figure 6:
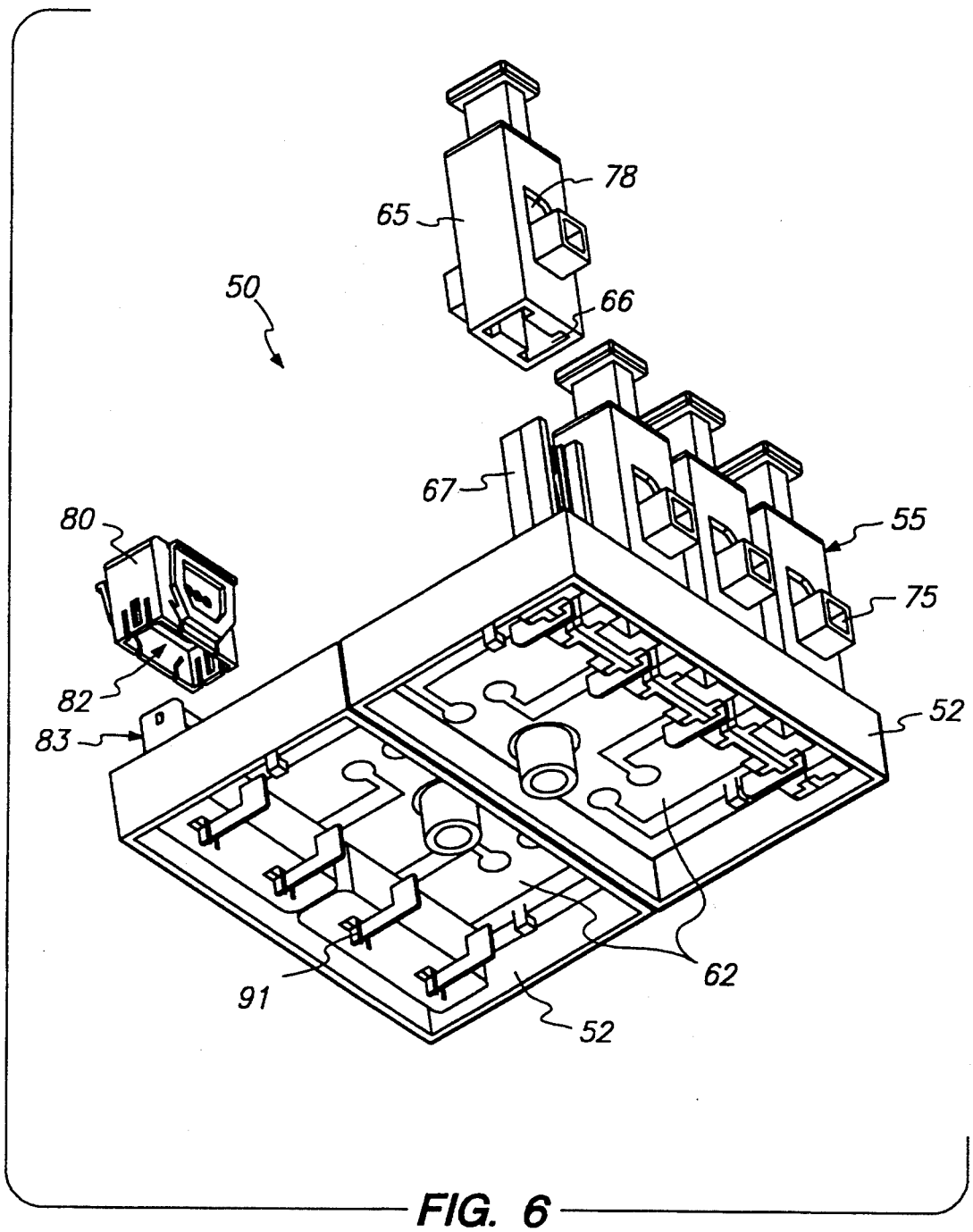
FIG. 6 is a bottom view of components of the FIG. 4 embodiment.
Figure 7:
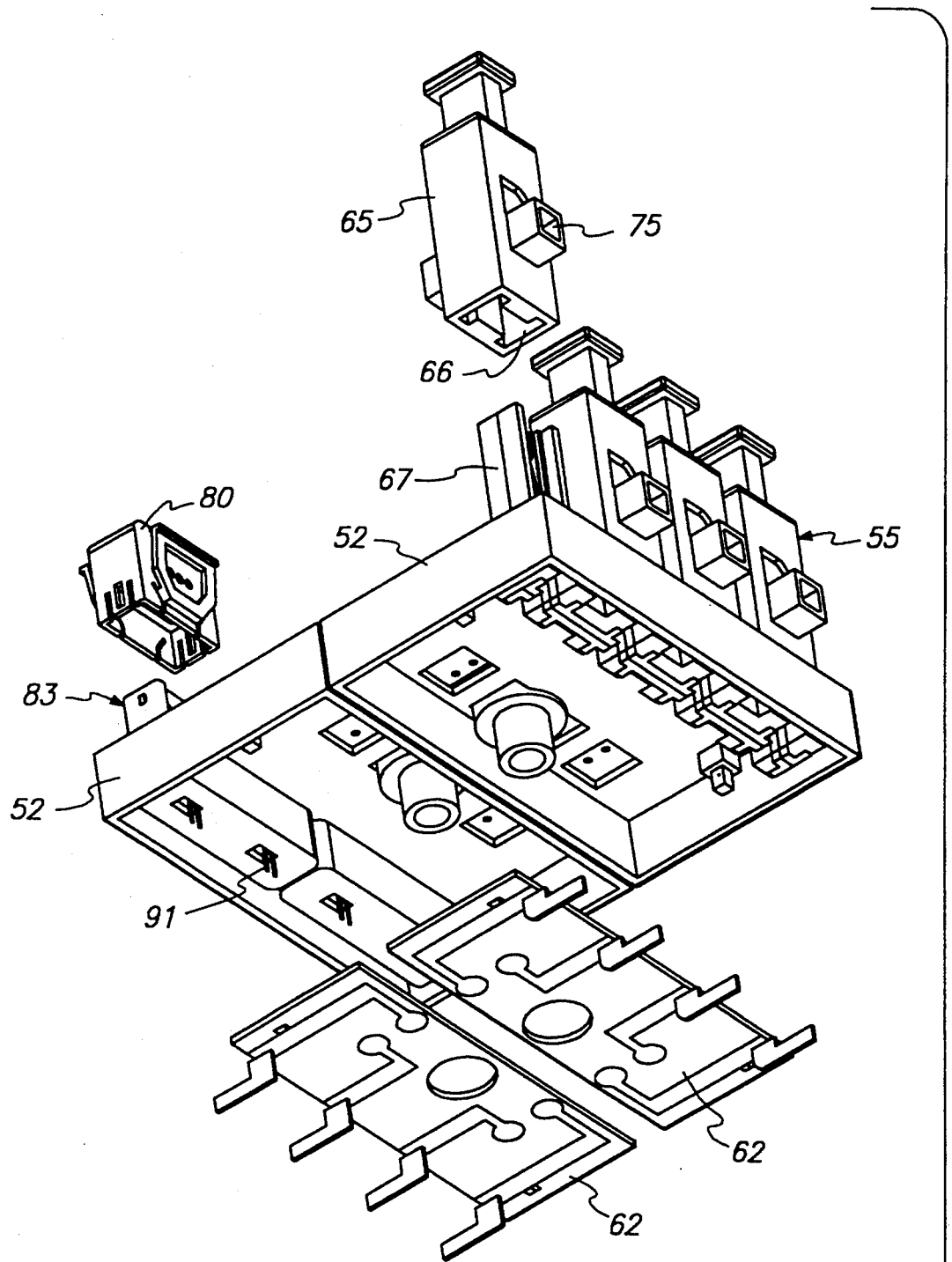
FIG. 7 is a further exploded view of the FIG. 6 embodiment.

Each base frame 52 also includes a multi-pin socket 60 on the top thereof and connected, such as by a printed circuit board 62 (FIGS. 5–7) inside the bottom of the frame 52 to the modules 55 or 56 mounted thereon. In the preferred embodiments, socket 60 is a five pin socket, and four termination modules 55 or 56 are mounted on each base frame 52 for terminating two 2-conductor telecommunication wire pairs. Thus, two of the five pins in socket 60 are for the respective tip wires of each pair and two others are for the respective ring wires. The fifth terminal is for a ground connection, as more fully described herein.

Although the termination modules 55 and 56 are substantially different in appearance, one from the other, they share many of the same functional features. For example, each has an insulation displacing connector (IDC) extending upwardly from the base frame 52, an opening for receiving the insulated wire conductor which is to be terminated, a manually operable push-pull driver module surrounding the insulation displacing connector, guides for supporting the driver module around the IDC for push-pull motion between open and connected positions relative thereto, a passageway in the driver module for receiving the wire conductor and moving it into and out of the IDC through the IDC's entry opening when the driver module is moved, respectively, to the connected and open positions, and an appropriate environmental sealant in the driver module for environmentally sealing the IDC located therein.

Describing the tower (wide-gauge) termination module 55 more particularly, it includes an outer housing or driver 65 having internal guide slots 66 which match and are received over an I-beam guide track 67 for defining relative sliding motion therebetween. The I-beam guide track 67, in turn, is supported in one of the openings 59 in the base frame 52. In the center of the I-beam guide track 67 is a suitable insulation displacing connector 70 selected for the range of conductors likely to be terminated at this side of terminal 50. As can be seen, tower module 55 is larger and more robust than the thimble termination module 56, since, in the preferred embodiment, IDC 70 is a robust connector capable of terminating insulated wire conductors ranging from 18½ gauge copper-coated steel to 24 gauge solid copper. The relatively large forces necessary to terminate the larger gauge steel core conductors are thus accommodated by the sizable I-beam guide track and slot and a finger cap 72 (for pulling the outer housing 65 back up). The insulation displacing connector art is well developed, and a variety of IDC's may therefore be selected according to the needs and preferences of the user. The preferred IDC for use in the preferred embodiment (FIGS. 4–7) of this invention is that which is described in co-pending U.S. patent application Ser. No. 08/046,059, filed 12 Apr. 1993, and assigned to the assignee of the present invention, the disclosure of which is incorporated herein by reference for all purposes. Thus, by terminating only a single wire per tower 55, sufficient force can be exerted manually on the outer housing driver 65 to drive the wire into the IDC 70 without the need for tools. The outer housing 65 is thus a push-pull driver.

The wire (not shown) is inserted through a passageway 75 in the driver 65 which extends across to a transparent blind boss 76 on the opposite side of the housing 65. The appearance of the wire in the boss 76 provides a visual indication, and thus serves as a visual indicator, that the wire has been fully and properly inserted through passageway 75. In known fashion, the wire is thus first inserted in passageway 75 when driver 65 is in the initial or open position, so that the wire is located at the entry opening of the IDC. Then, when the driver 65 is pushed toward the base frame 52, passageway 75 drives the wire into the connected position on the IDC.

Driver 65 may optionally be provided with a test port 78 to enable a probe (alligator clip and so forth) to be inserted to make temporary electrical contact with the IDC. The base of the IDC is provided with a suitable connector 79 (see FIG. 29) for coupling electrically to the PC board 62.

To protect the IDC 70 and the wire termination thereat from environmental contamination, driver 65 is also preferably filled with a suitable environmental sealant, such as gel (not shown), as is well known in the art.

The smaller thimble module 56, on the other hand, is optimized for a different application. Accordingly, the thimble driver 80 has a suitable rectangular core 82, open through the bottom thereof, for receipt on a matching guide frame 83 which defines the exterior of a small-gauge IDC 85. IDC 85, being intended for terminating only a limited range of wire conductor sizes, such as 22 to 24 gauge solid copper inside wire, can perform its function with simple, limited range tuning fork IDC's 86. Advantageously, since much less force is necessary to terminate such conductors, and since the individual IDC's 86 are much smaller, a plurality of the IDC's 86 (preferably four) is provided in the IDC 85. Correspondingly, four passageways 88 are provided in driver 80 for receiving the wires and driving them into and out of IDC 85 similarly to the function of passageway 75 in driver 65.

As an alternative to the visual indicator 76 in driver 65, thimble termination module 56 combines passageways 88 which extend entirely through driver 80 with a wire trim cut-off blade 90 on the back side of the IDC 85, opposite the tuning fork IDC's 86. In use, the wires are thus inserted entirely through the passageways 88 when the driver is in the open position, and then when driver 80 is manually pushed toward base frame 52, passageways 88 push the wires into the tuning fork IDC's 86 and excess wire is simultaneously trimmed and cut off by the blade 90 on the back side of the IDC 85.

IDC 85 includes a base connector 91 corresponding to the base connector 79 of the wide-gauge IDC 70. Likewise, thimble driver 80 is filled with a suitable environmental sealant, preferably gel, as described for driver 65.

In the preferred embodiments, four thimble termination modules are mounted on the base frame 52 for terminating two 2-conductor telecommunication wire pairs. Thus, as with the tower termination modules, there are two tip thimble termination modules and two ring modules. As has been seen, however, each IDC 85 includes four tuning fork IDC's 86. Thus, the small-gauge thimble termination modules also conveniently provide for bridging connections thereat.

To assure that the thimble drivers 80 remain in the connected position when manually pushed thereto, the drivers are provided with a slot and tab latch 94 having a finger squeeze latch release 95. The slot and tab latchs 94 secure the driver in the connected position when removed thereto, and as the slot engages the tab, provides a tactile indicator for indicating when the driver 80 has been moved to its connected position. Squeezing the finger squeeze releases 95 then pivots the slots away from the tabs, releasing the driver 80 and allowing it to be easily withdrawn to the open position by pulling on the finger squeeze releases 95.

Figure 2:
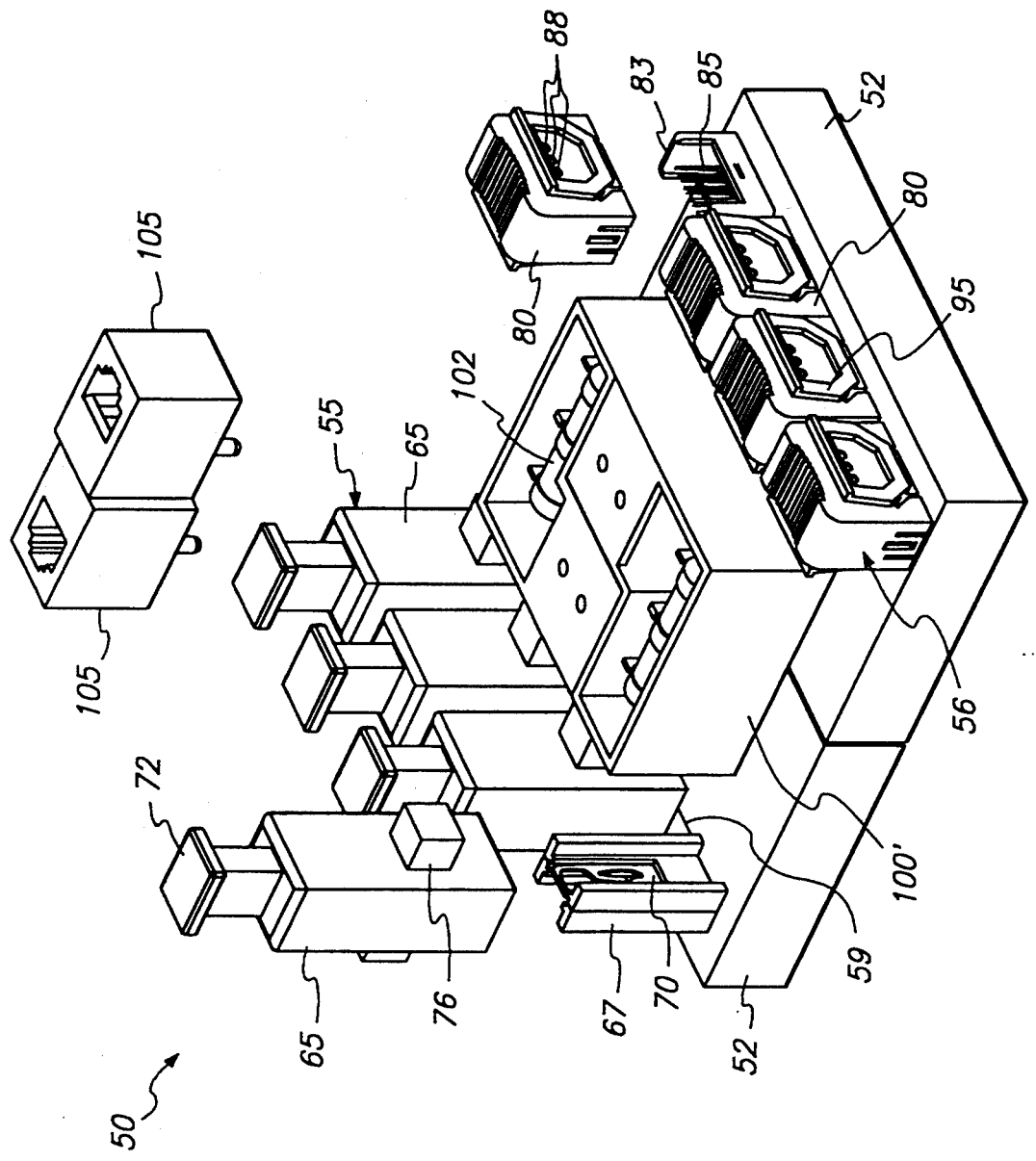
FIG. 2 is an illustration of the FIG. 1 device from the opposite side thereof.
Figure 3:
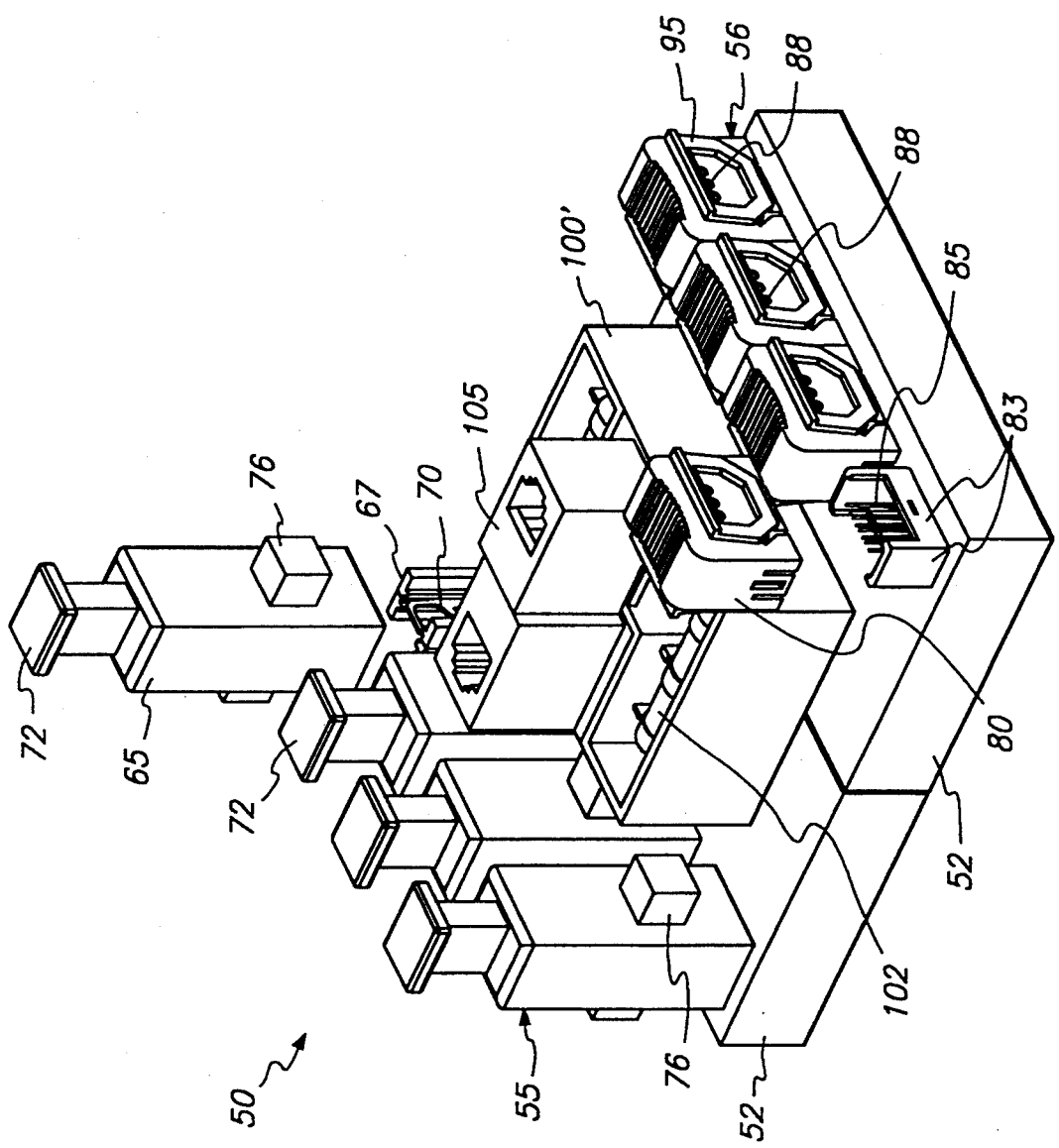
FIG. 3 is a view similar to FIG. 2 with additional parts moved to show more particular details of the terminal.
Figure 4:
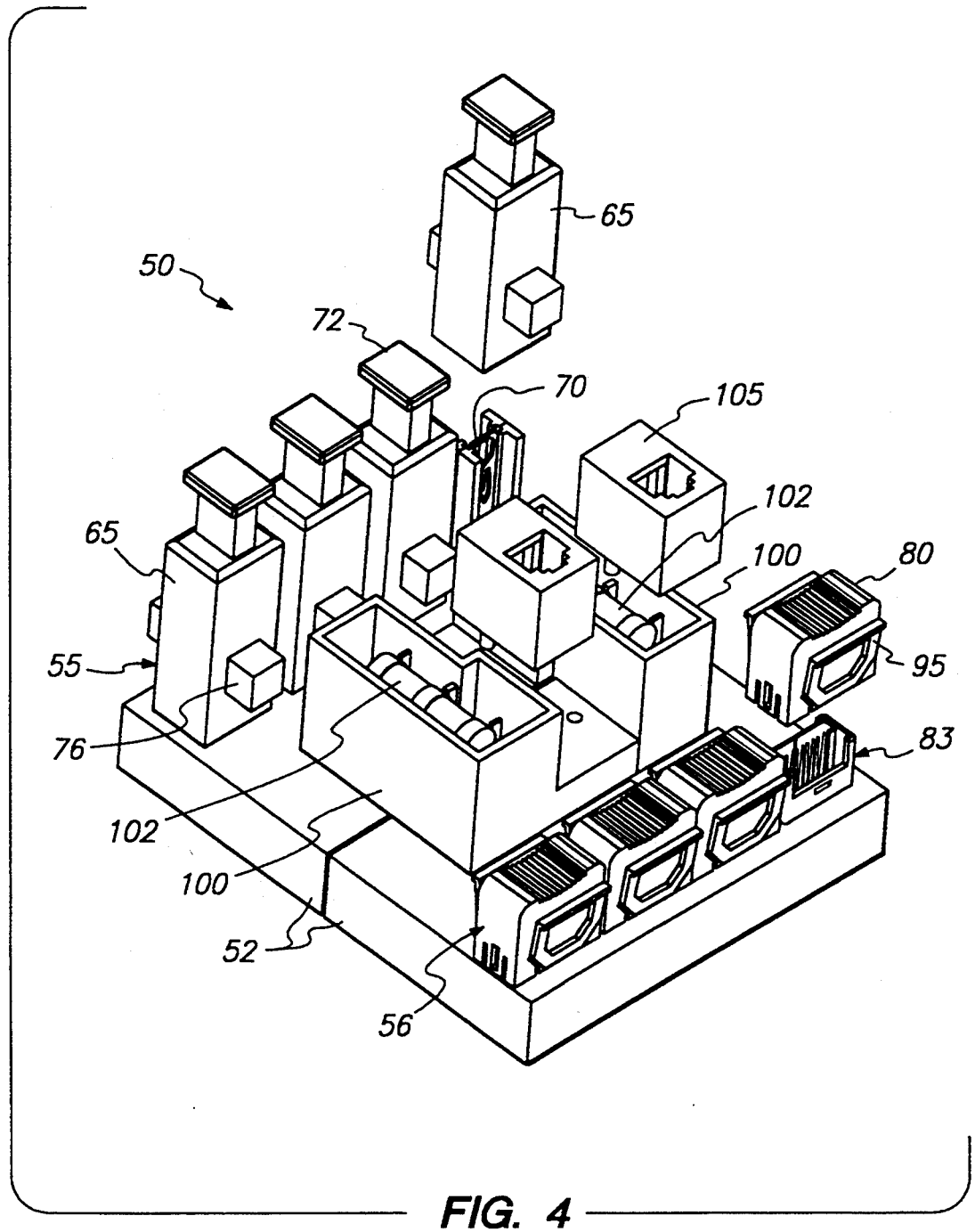
FIG. 4 is a view similar to FIG. 3 of a slightly modified embodiment of the invention, wherein the shelf which supports the RJ-11 plugs is recessed.

FIG. 4 shows a bridging module 100 which is configured for electrically connecting a five pin socket 60 on one base frame 52 to another five pin socket on another such base frame, such that the assembled components then provide the terminal 50. As seen in FIG. 4, two such bridging modules 100 are employed, one for each signal conducting pair (tip and ring). Bridging module 100 (which in service will be closed on the top, but is shown without the lid for clarity of illustration) is substantially rigid to provide mechanical coupling of the base frames 52 to one another. Within module 100 there may be provided electrical components, such as a protection device 102 for responding to condition faults at the socket 60, such as over-voltage or over-current conditions. Alternatively, active electrical circuits (not shown) for processing signals between the pins in sockets 60 may be provided in lieu of or in addition to protector 102. Connections within module 100 are provided by a suitable printed circuit board 103 having plug pins 104 thereon for engaging the five pin sockets 60 on the base frames 52. Also, when terminal 50 is configured as a network interface device, a suitable RJ-11 socket 105 may be plugged into module 100 for testing purposes. In the preferred embodiment, RJ-11 105 is a gel-sealed shunt plug as taught more particularly in U.S. Pat. No. 5,111,497, issued May 5, 1992, and assigned to the assignee of the present invention, the disclosure of which is incorporated herein by reference for all purposes. (Bridging module 100' illustrated in FIGS. 1-3 is essentially the same as bridging module 100 in FIGS. 4-5, except that module 100' positions the RJ-11 sockets at an elevated rather than a recessed position.)

Figure 8:
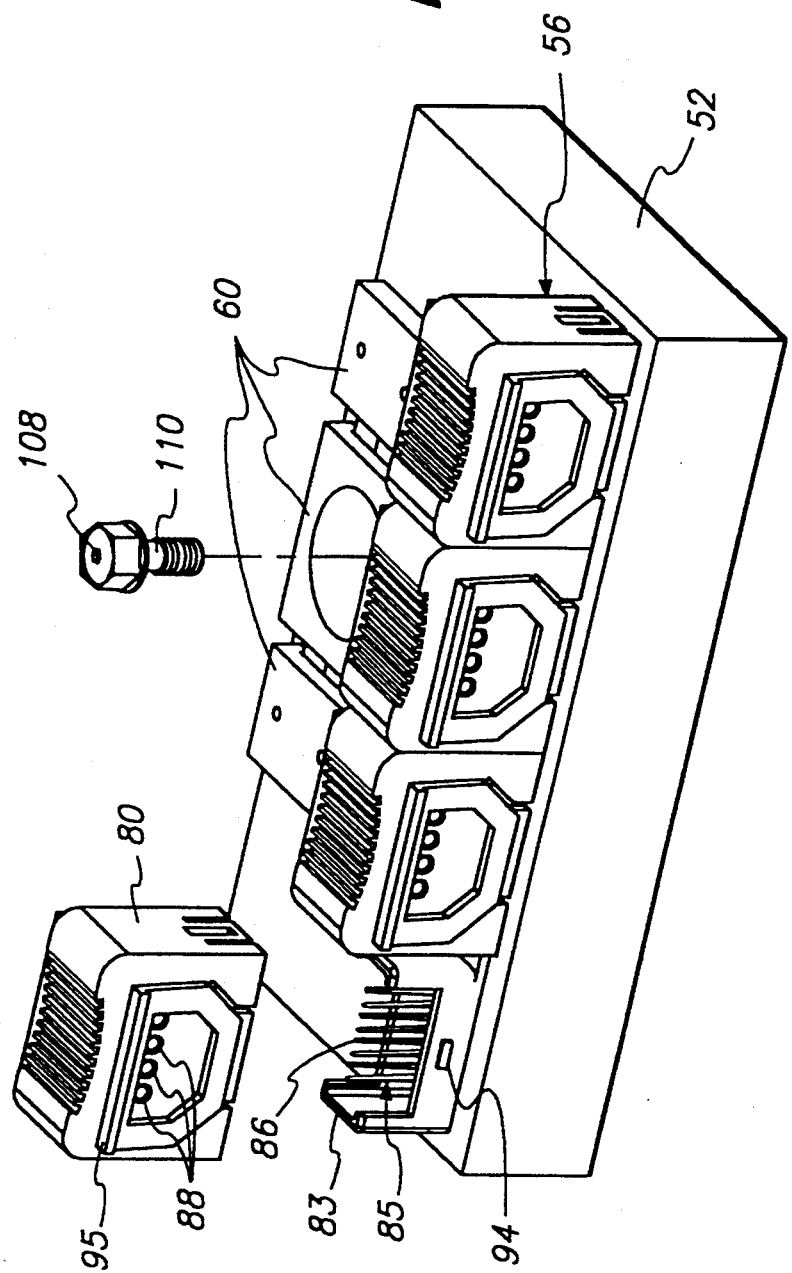
FIG. 8 is an isometric, partially exploded view of the base frame portion of the previous embodiments configured with a small-gauge thimble termination module according to the present invention.
Figure 9:
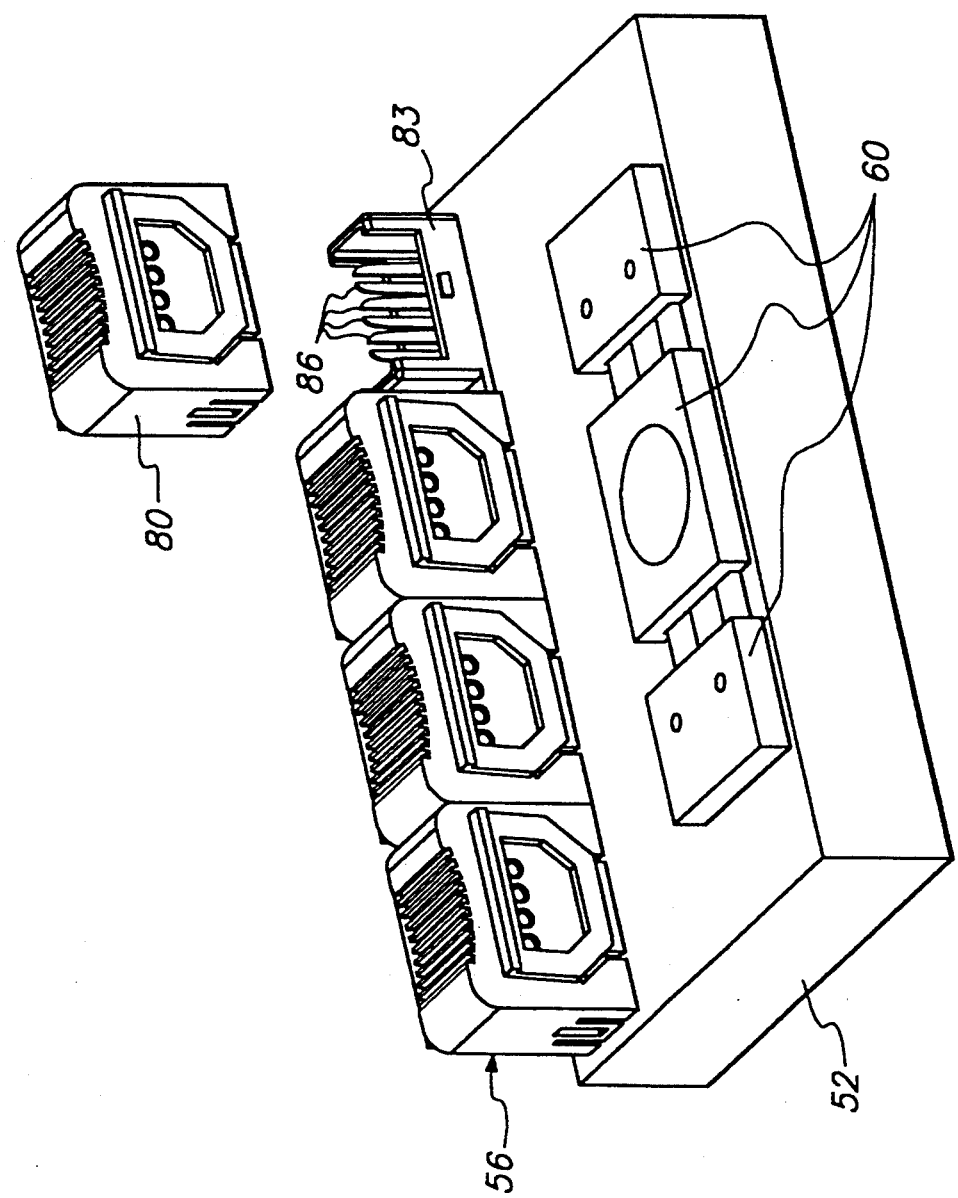
FIG. 9 is a view from the opposite side shown in FIG. 8.
Figure 10:
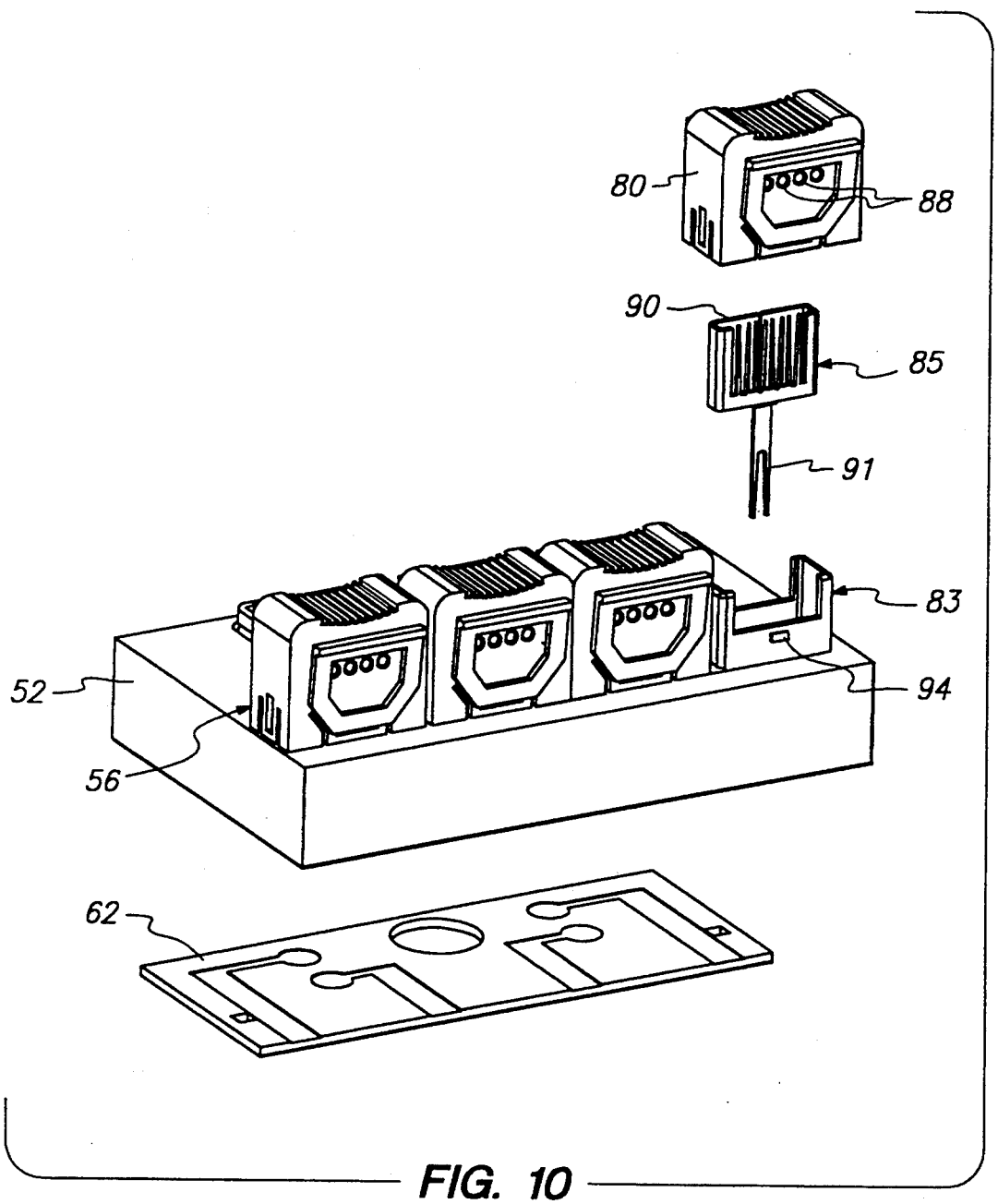
FIGS. 10 and 11 are partially exploded views from yet another angle of the embodiments shown in FIGS. 8 and 9.
Figure 11:
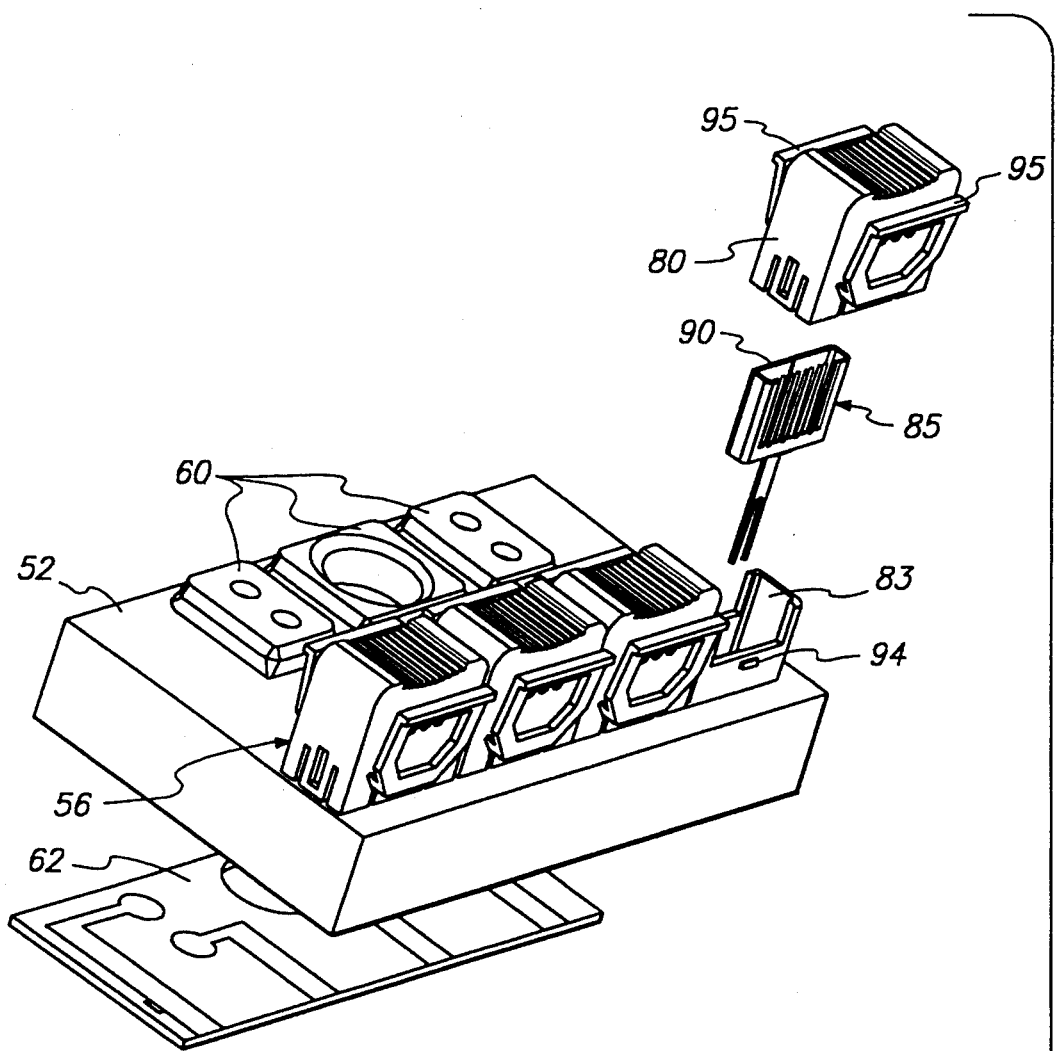
Figure 12:
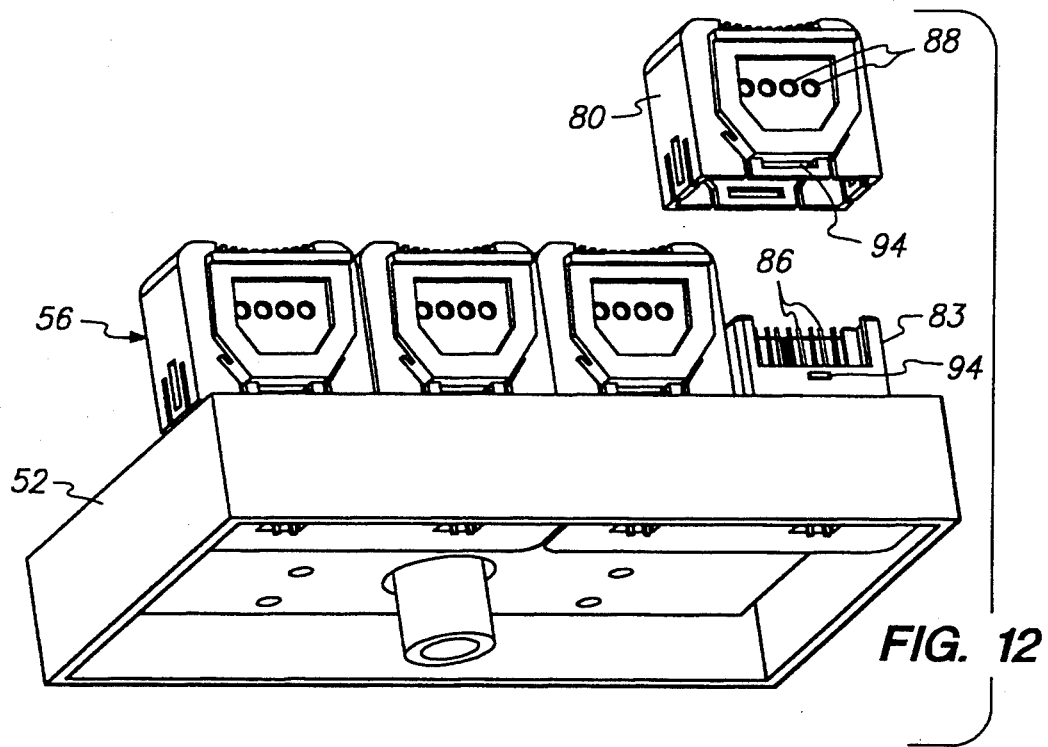
FIGS. 12 and 13 are additional views from various angles of components of the configuration shown in FIGS. 8 and 9.
Figure 13:
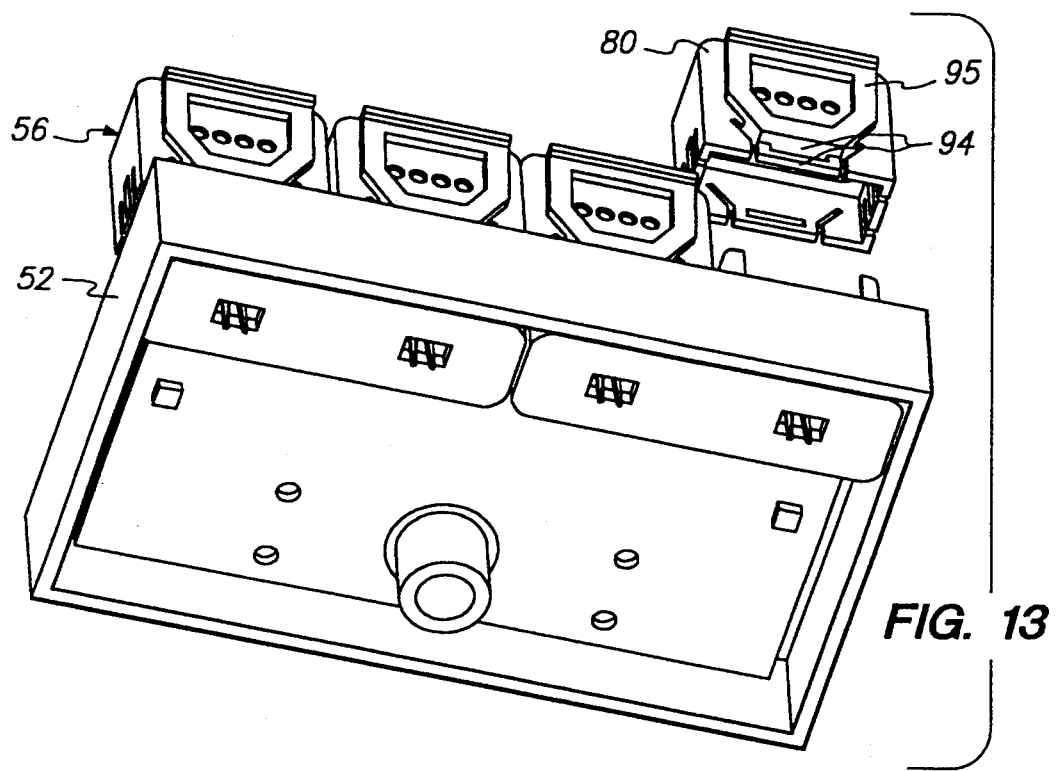
Figure 16:
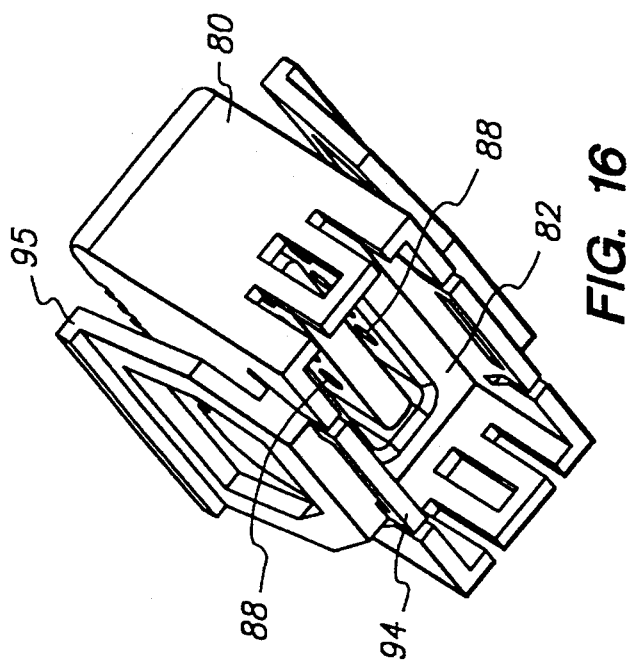
FIGS. 14–19 are views from various angles of the thimble driver module.
Figure 15:
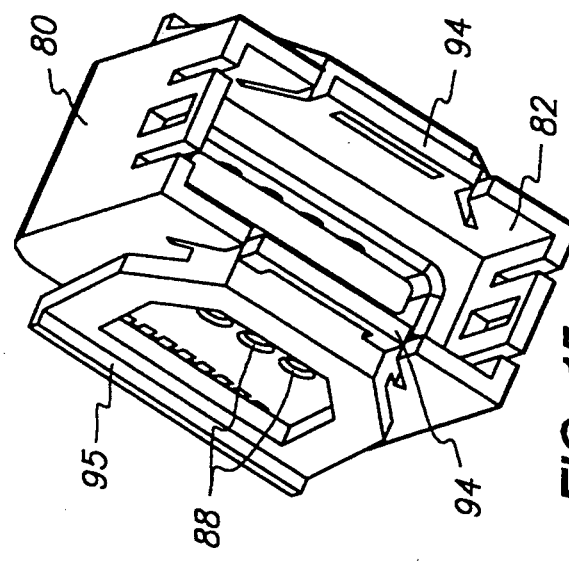
Figure 14:
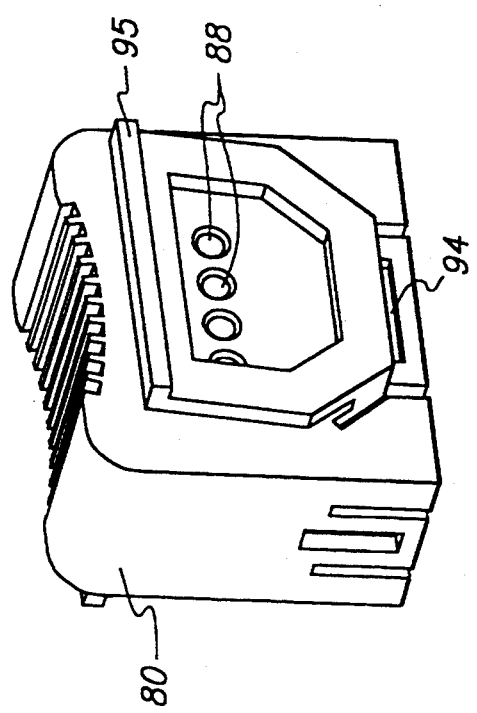
Figure 19:
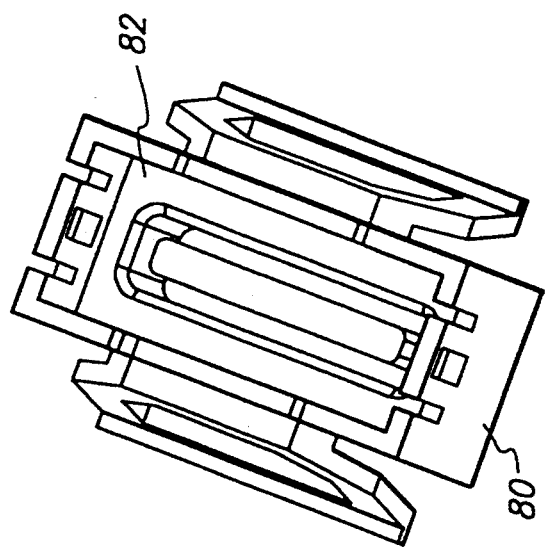
Figure 18:
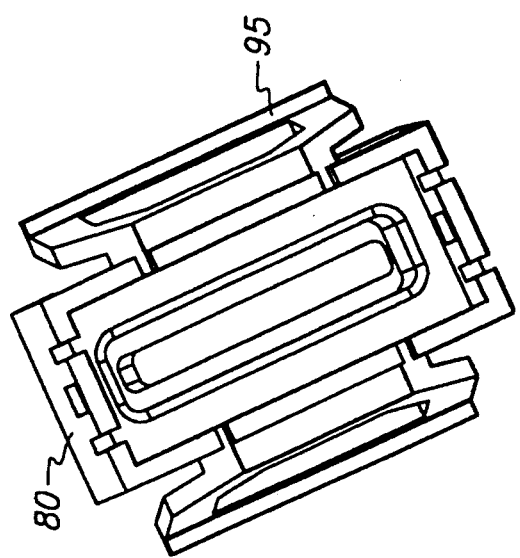
Figure 17:
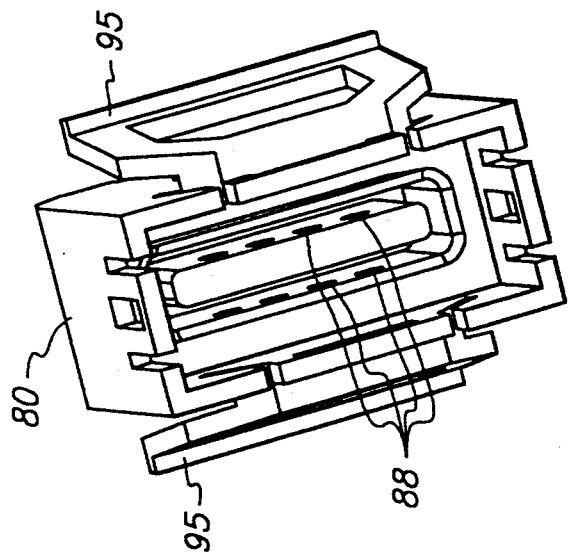
Figure 22:
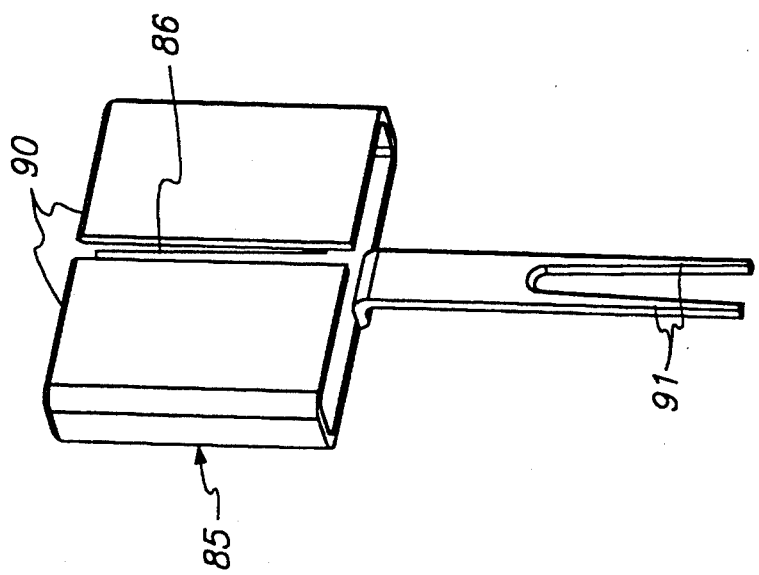
FIG. 22 is a rear view of the IDC illustrated in FIGS. 20–21.
Figure 21:
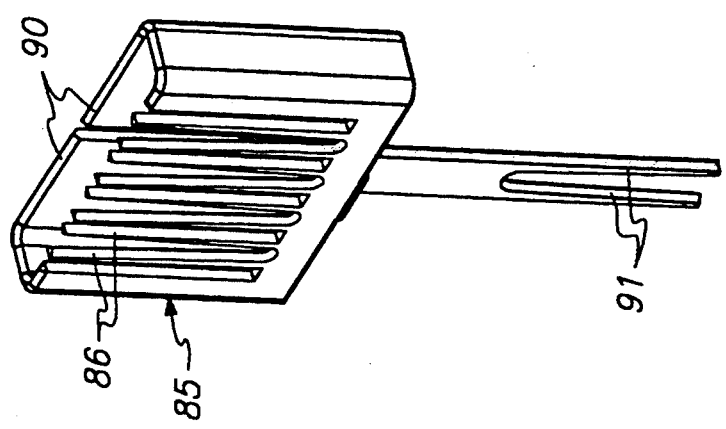
FIGS. 20–21 are front views of the bridging IDC of the small-gauge thimble termination module.
Figure 20:
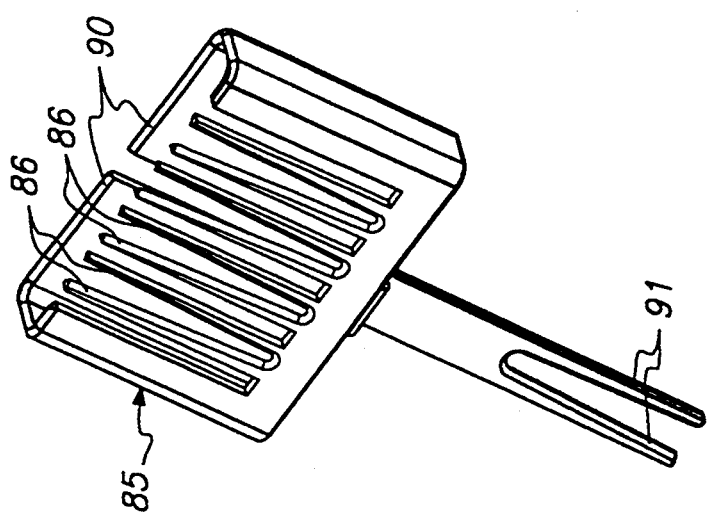
Figure 23:
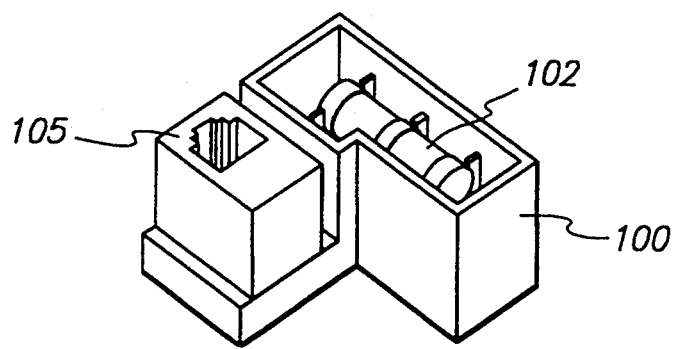
FIG. 23 is an enlarged view of the bridging module illustrated in the FIG. 4–FIG. 5 embodiment.
Figure 24:
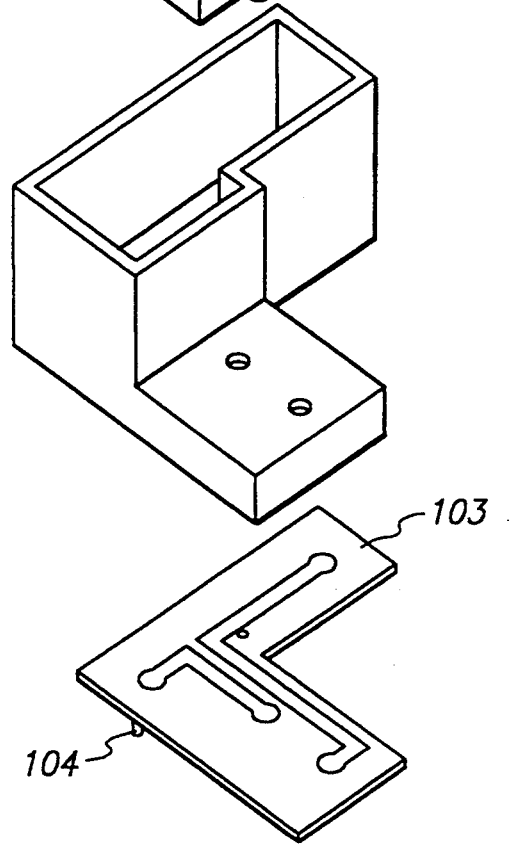
FIGS. 24 and 25 are top and bottom isometric exploded views, respectively, of the FIG. 23 module.
Figure 25:
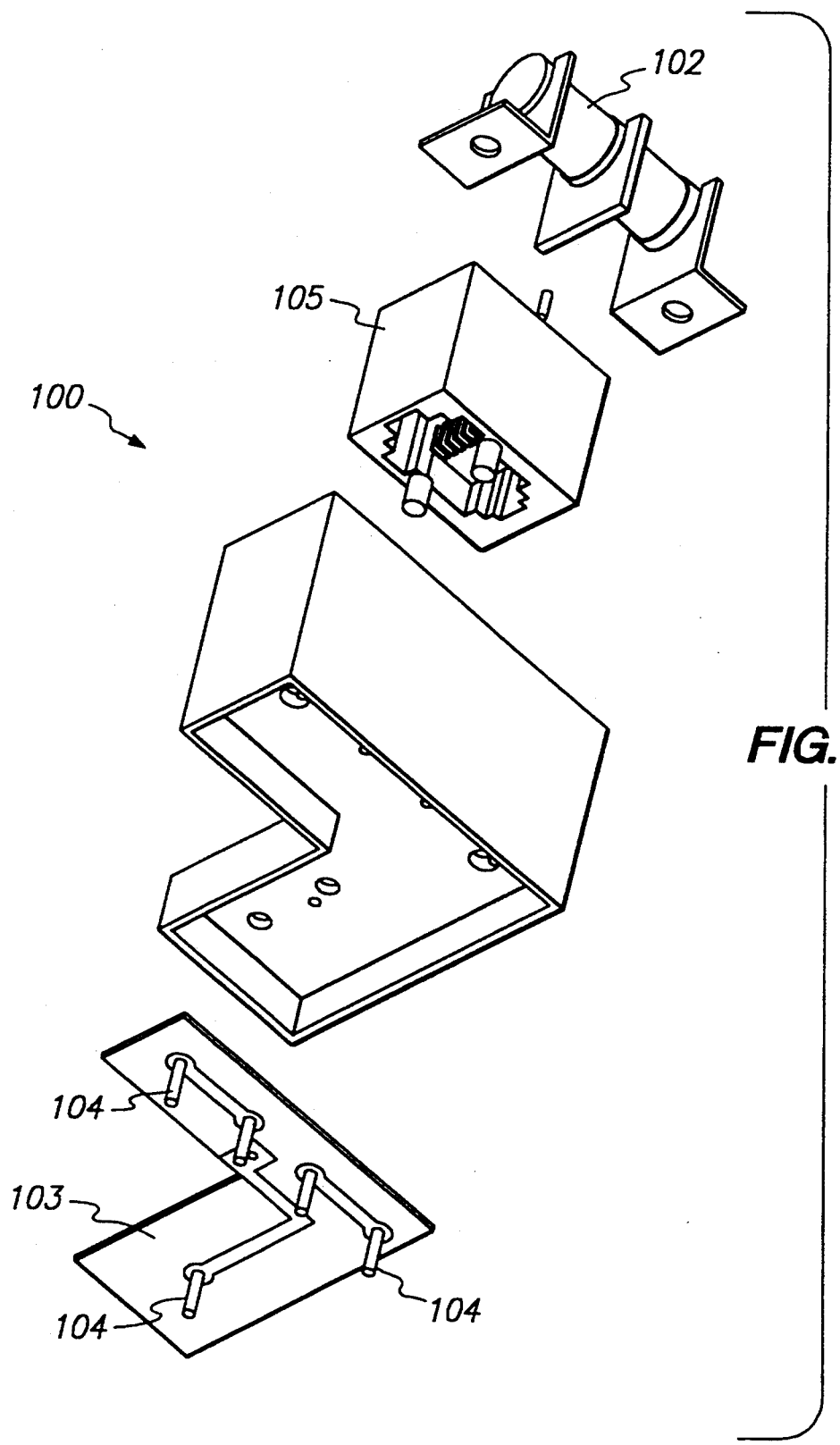

To provide a convenient ground connection for the base frames 52 and modules 100, the fifth pin socket of each multi-pin socket 60 is in fact a receptacle hole 108 in the head of a metallic mounting bolt 110 (FIG. 8). The pin socket 108 thus economically allows the mounting bolt 110 to serve the multiple purposes of securing the base frames on to whatever metallic housing is preferred by the end user, and simultaneously grounding the base frames and bridging modules to that housing.

Figure 26:
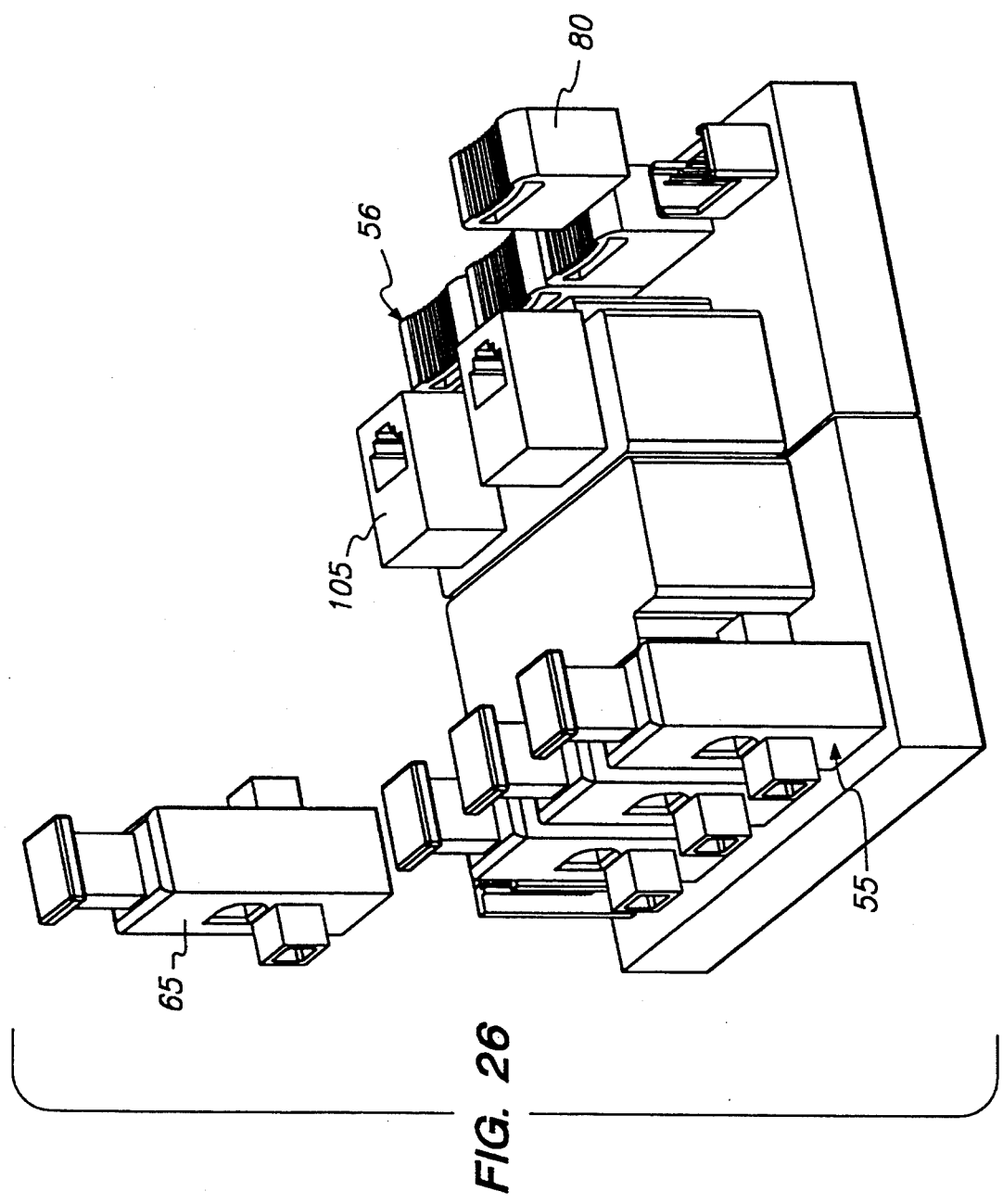
FIG. 26 is a partially exploded isometric view of another embodiment of the invention.
Figure 27:
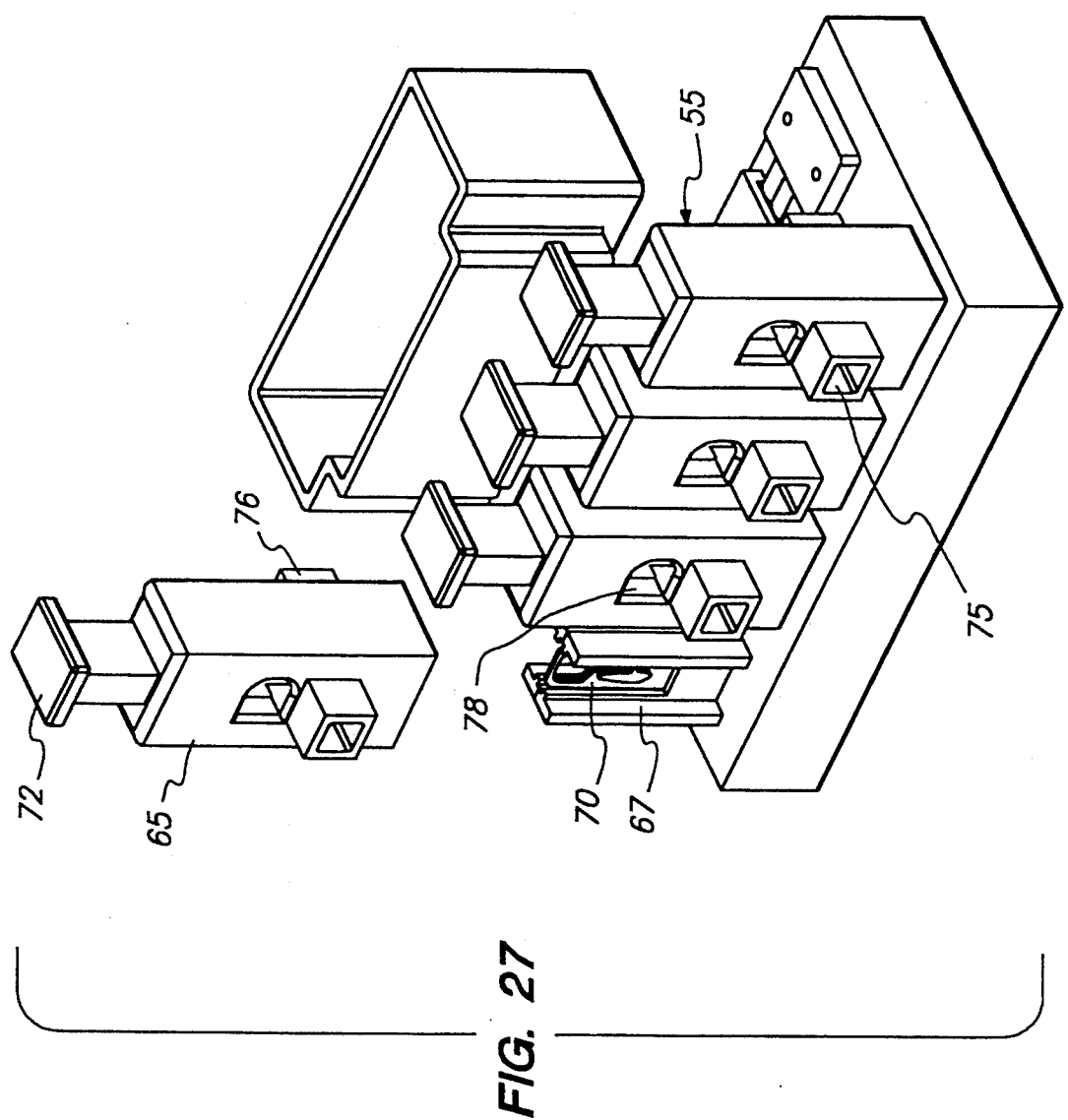
FIG. 27 is a partially exploded view of the wide-gauge tower side of the FIG. 26 embodiment.
Figure 28:
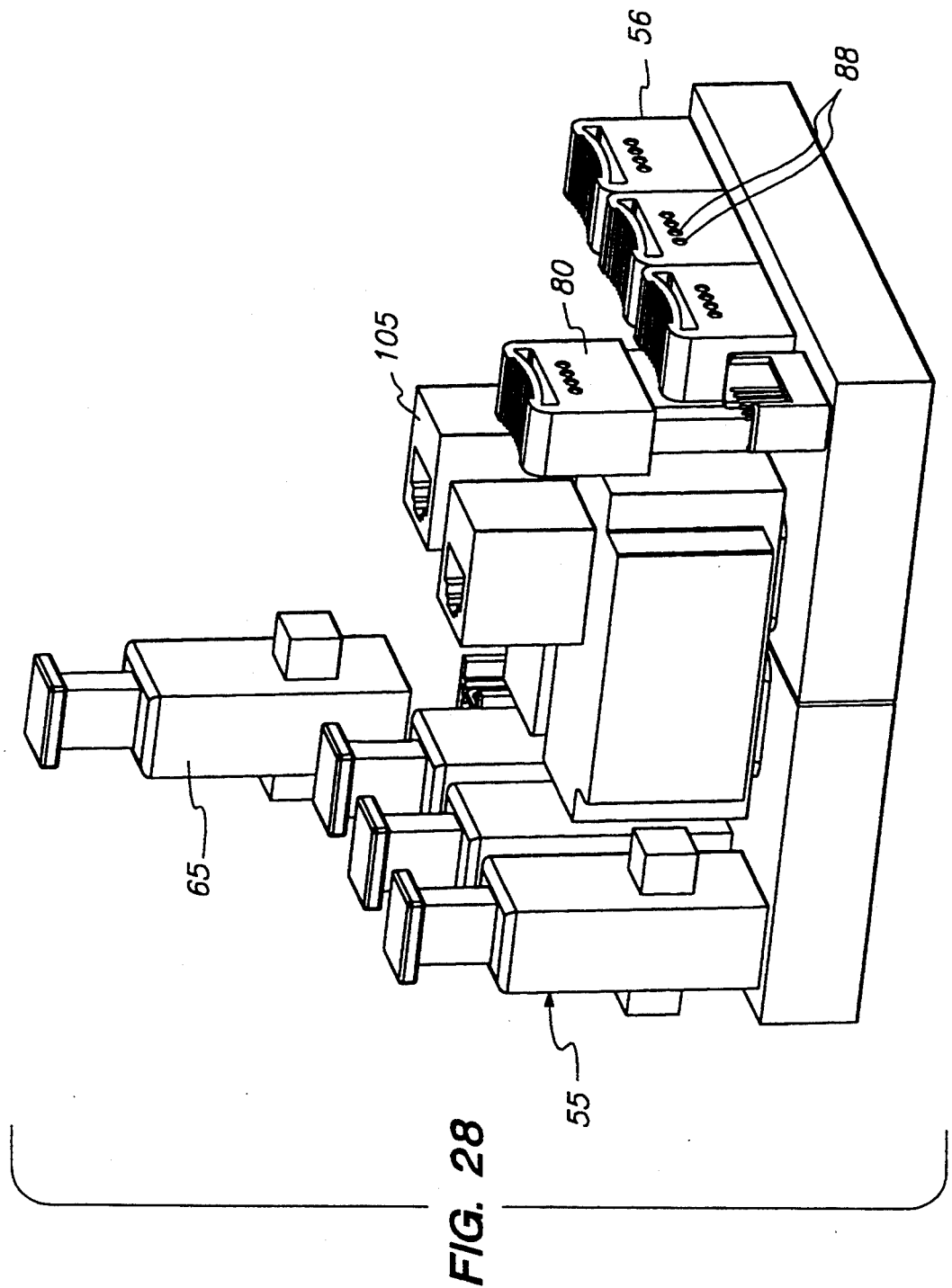
FIG. 28 is a partially exploded isometric view of still another embodiment of the invention.
Figure 29:
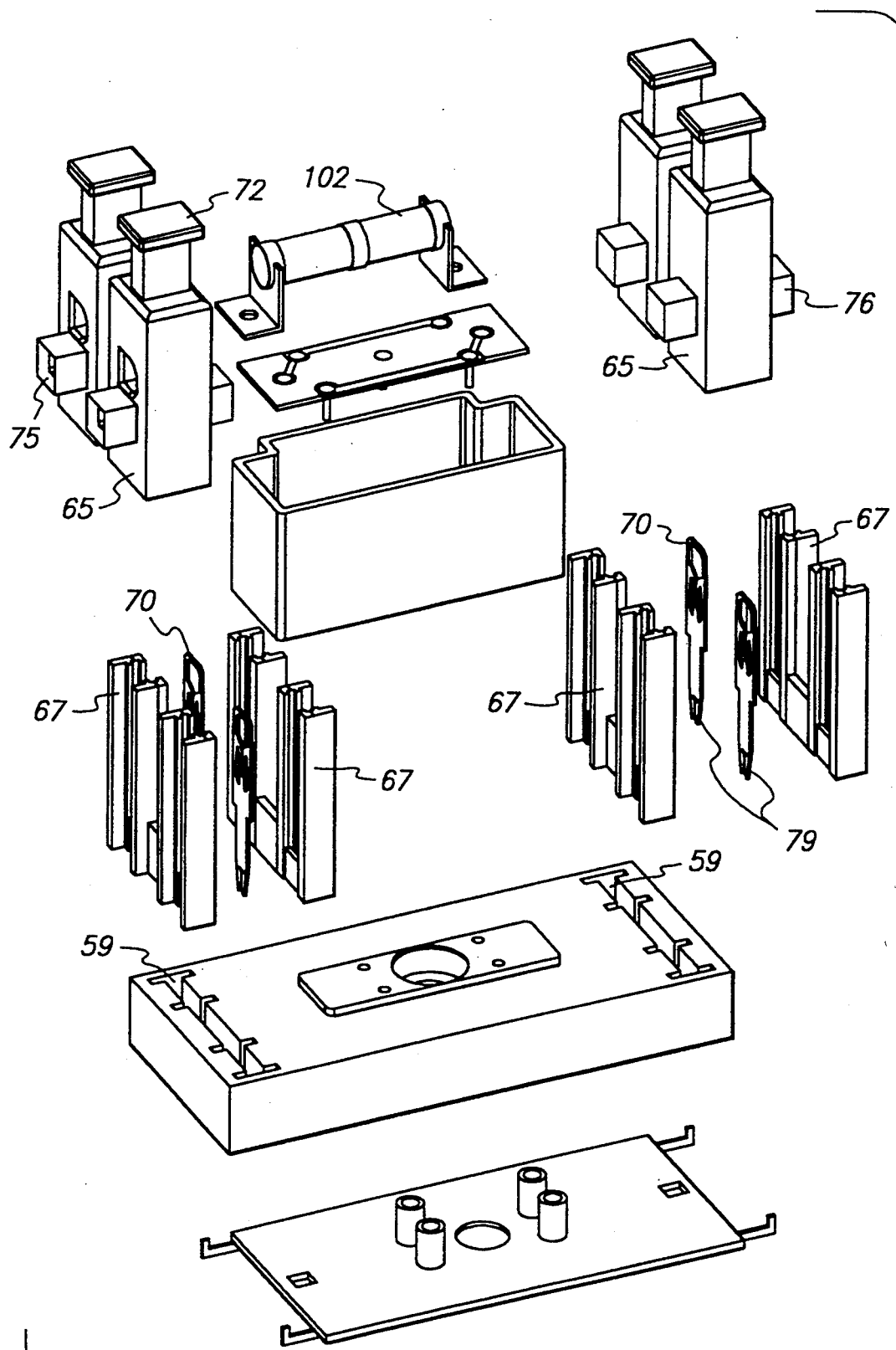
FIG. 29 is an exploded isometric view of still another embodiment of the invention.

Finally, FIGS. 26-29 illustrate some of the versatility of the present invention. FIGS. 26 and 27 illustrate bridging modules which may be configured to bridge from one pair to the other pair on the same base frame. FIG. 28 shows how bridging modules similar to those in FIGS. 26 and 27 could be made for bridging from one base frame to another. FIG. 29 illustrates a base frame which provides the same functionality as in FIG. 27 but in a back-to-back arrangement rather than side-to-side.

Figure 5:
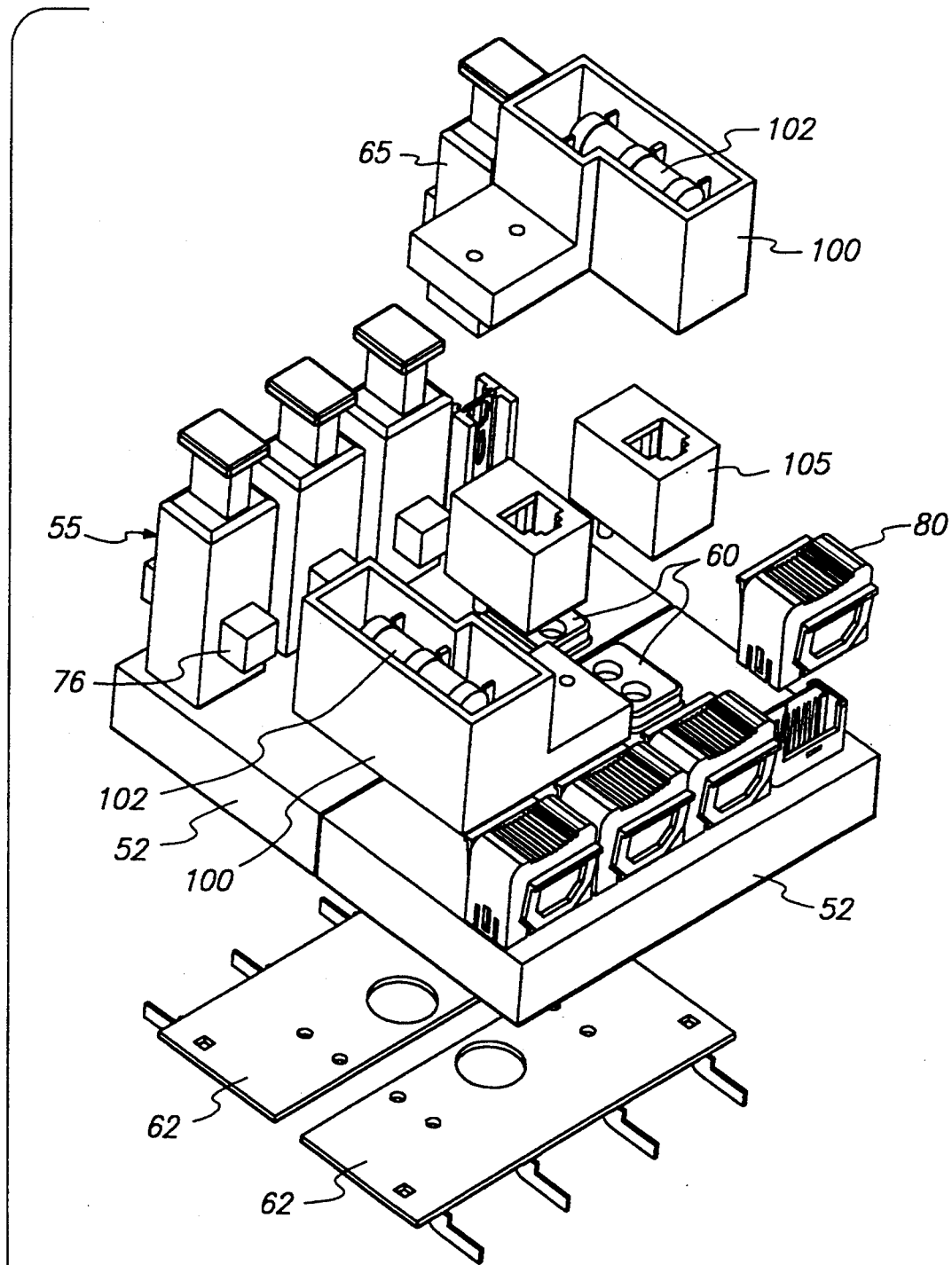
FIG. 5 is a further exploded view of the device illustrated in FIG. 4.

As may be seen, therefore, the present invention provides numerous advantages. Principally, it provides an inexpensive, versatile and rugged, reliable, uncomplicated, flexibly adaptable, and re-enterable modular telecommunications terminal for making and breaking connections with insulated wire conductors. Where circuit protection is required, this is readily provided by selecting the appropriate bridging module and simply plugging it in. If active electronics is desired, a bridging module incorporating such electronics is used instead, and so forth. While the preferred embodiment illustrated in FIGS. 4-5 is a NID application, FIGS. 27 and 29 illustrate how easily the present invention may be modified for a cross-connect terminal. It will thus now be clear how additional terminal configurations can readily be assembled using the teachings of the present invention, such as, for instance, the several terminal configurations mentioned hereinabove at the beginning of the background discussion.

Claim dependencies have been drafted to comply with PCT Rule 6.4, but it will be understood that, at least by virtue of this paragraph, any appropriate combination of the features disclosed and/or claimed herein is in itself an embodiment of the invention, and it is intended to use multiple dependent claims in the national phase where permitted.

Therefore, while the methods and forms of apparatus herein described constitute preferred embodiments of this invention, it is to be understood that the invention is not limited to these precise methods and forms of apparatus, and that changes may be made therein without departing from the scope of the invention.

What is claimed is:

1. A modular, re-enterable telecommunications terminal for making and breaking connections with insulated wire conductors, comprising:
   a) a base frame having:
      i) module receiving means for receiving wire termination modules,
      ii) a multi-pin socket on said base frame, and
      iii) means for electrically connecting modules in said module receiving means to said socket,
   b) at least one tool-less wire termination module supported on said module receiving means, said termination module including:
      i) an insulation displacing connector extending outwardly from said base frame and having means defining an entry opening for receiving such an insulated wire conductor,
      ii) a manually operable push-pull driver module surrounding said insulation displacing connector,
      iii) guide means supporting said driver module around said insulation displacing connector for push-pull motion between open and connected positions relative to said insulation displacing connector,
      iv) means defining a passageway in said driver module for passing such an insulated wire conductor into said driver module and moving the wire conductor into and out of said insulation displacing connector through said entry opening therein when said driver module is moved, respectively, to said connected and said open positions, and
      v) environmental sealant in said driver module for environmentally sealing said insulation displacing connector in said driver module, and
   c) at least one bridging module configured for electrically connecting said multi-pin socket to another such multi-pin socket on another such base frame when juxtaposed thereto.

2. The terminal of claim I wherein said tool-less wire termination module further comprises a wide-gauge tower capable of re-enterably manually terminating insulated wire conductors ranging from 18½ gauge copper-coated steel to 24 gauge solid copper.

3. The terminal of claim 2 wherein said environmental sealant is a gel.

4. The terminal of claim 2 wherein said tower further comprises a visual wire indicator therein for visually confirming receipt through said driver module passageway of such an insulated wire conductor.

5. The terminal of claim 2 wherein said manually operable push-pull driver module further comprises a finger cap on the end thereof opposite said base frame for facilitating gripping said driver by means of fingers to manually pull said driver to said open position.

6. The terminal of claim 2 wherein said guide means further comprises I-beam guide tracks supported in said module receiving means, and means defining corresponding I-beam guide slots in said wide-gauge tower, said guide slots receiving said guide tracks therein.

7. The terminal of claim I wherein said tool-less wire termination module further comprises a small-gauge thimble capable of re-enterably manually terminating insulated wire conductors ranging from 22 to 24 gauge solid copper.

8. The terminal of claim 7 wherein said environmental sealant is a gel.

9. The terminal of claim 7 wherein said driver module and said insulation displacing connector include multi-wire bridging means.

10. The terminal of claim 7 wherein said driver module includes a tactile indicator for indicating when said driver has been moved to said connected position.

11. The terminal of claim 10 wherein said tactile indicator further comprises a snap locking connector for securing said driver in said connected position when moved thereto.

12. The terminal of claim 11 wherein said snap locking connector further comprises a slot and tab latch having a finger squeeze latch release.

13. The terminal of claim 7 wherein said insulation displacing connector further comprises a wire trim cut-off blade positioned inside said driver for intercepting and cutting off excess such insulated wire extending through said driver module passageway when said driver is moved from said open to said connected position.

14. The terminal of claim 1 wherein said bridging module is substantially rigid and thereby also provides for mechanically coupling said base frame to another such base frame.

15. The terminal of claim 1 wherein said bridging module further comprises electrical protection means connected for responding to condition faults at said socket such as over-voltage or over-current conditions.

16. The terminal of claim 15 wherein said bridging module further comprises a gel-sealed RJ-11 test module connected thereto for testing electrical signals at said socket.

17. The terminal of claim 15 wherein said bridging module further comprises active electrical circuit means connected for processing signals between said pins on said socket and other pins on another such socket.

18. The terminal of claim 15 wherein said bridging module further comprises a gel seal for environmentally sealing said module to said base frame.

19. The terminal of claim I further comprising a metallic mounting bolt in said base frame connected for mounting said frame to a metallic housing and for electrically grounding said base frame thereto, said bolt having means defining a pin socket in the head thereof, and said pin socket being positioned to provide a ground pin socket portion for said multi-pin socket.

20. A modular, re-enterable telecommunications terminal for making and breaking connections with insulated wire conductors, comprising:
   a) a first base frame having:
      i) module receiving means for receiving wire termination modules,
      ii) a five pin socket on said base frame, and
      iii) means for electrically connecting modules in said module receiving means to said socket,
   b) at least one tool-less wire termination module supported on said module receiving means, said termination module being a wide-gauge tower capable of re-enterably manually terminating insulated wire conductors ranging from 18½ gauge copper-coated steel to 24 gauge solid copper and including:
      i) an insulation displacing connector extending outwardly from said base frame and having means defining an entry opening for receiving such an insulated wire conductor,
      ii) a manually operable push-pull driver module surrounding said insulation displacing connector,
      iii) guide means supporting said driver module around said insulation displacing connector for push-pull motion between open and connected positions relative to said insulation displacing connector, said guide means including I-beam guide tracks supported in said module receiving means, and means defining corresponding I-beam guide slots in said wide-gauge tower, said guide slots receiving said guide tracks therein,
      iv) means defining a passageway in said driver module for passing such an insulated wire conductor into said driver module and moving the wire conductor into and out of said insulation displacing connector through said entry opening therein when said driver module is moved, respectively, to said connected and said open positions,
      v) a visual wire indicator for visually confirming receipt through said driver module passageway of such an insulated wire conductor,
      vi) gel sealant in said driver module for environmentally sealing said insulation displacing connector in said driver module, and
      vii) a finger cap on the end of said manually operable push-pull driver module opposite said base frame for facilitating gripping said driver by means of fingers to manually pull said driver to said open position,
   c) a second base frame substantially like said first base frame and positioned adjacent thereto with said five pin sockets of said base frames juxtaposed to each another,
   d) at least one tool-less wire termination module supported on said module receiving means of said second base frame, said termination module being a small-gauge thimble capable of re-enterably manually terminating insulated wire conductors ranging from 22 to 24 gauge solid copper and including:
      i) an insulation displacing connector extending outwardly from said base frame and having means defining an entry opening for receiving such an insulated wire conductor, ii) a manually operable push-pull driver module surrounding said insulation displacing connector, iii) said driver module and said insulation displacing connector including multi-wire bridging means, iv) guide means supporting said driver module around said insulation displacing connector for push-pull motion between open and connected positions relative to said insulation displacing connector, v) means defining a passageway in said driver module for passing such an insulated wire conductor into said driver module and moving the wire conductor into and out of said insulation displacing connector through said entry opening therein when said driver module is moved, respectively, to said connected and said open positions, vi) said insulation displacing connector having a wire trim cut-off blade positioned inside said driver for intercepting and cutting off excess such insulated wire extending through said driver module passageway when said driver is moved from said open to said connected position, vii) said driver module including a tactile indicator for indicating when said driver has been moved to said connected position, said tactile indicator including a slot and tab latch snap locking connector, and a finger squeeze latch release, for releasably securing said driver in said connected position when moved thereto, and viii) gel sealant in said driver module for environmentally sealing said insulation displacing connector in said driver module, e) at least one substantially rigid bridging module configured for electrically connecting said five pin sockets to one another and mechanically coupling said base frames to one another, said bridging module having electrical protection means connected for responding to condition faults at said sockets such as over-voltage or over-current conditions, and having a gel seal for environmentally sealing said bridging module to said base frames, f) a gel-sealed RJ-11 test module connected to at least one said bridging module for testing electrical signals at said sockets, and g) a metallic mounting bolt in each of said base frames connected for mounting said frames to a metallic housing and for electrically grounding said base frames thereto, said bolts each having means defining a pin socket in the heads thereof, and said pin sockets being positioned to provide a ground pin socket so portion for each said five pin socket.

21. A modular, re-enterable telecommunications terminal for making and breaking connections with insulated wire conductors, comprising:

a) a base frame having:
   i) module receiving means for receiving at least one wire termination module,
   ii) a multi-pin socket on said base frame, and
   iii) means for electrically connecting modules in said module receiving means to said socket, b) at least one tool-less wire termination module supported on said module receiving means, said termination module including:
   i) a plurality of electrically connected insulation displacing connectors extending outwardly from said base frame and having means defining corresponding entry openings for receiving insulated wire conductors,
   ii) a manually operable push-pull driver module surrounding at least two of said insulation displacing connectors to provide a multi-wire bridging connection,
   iii) guide means supporting said driver module around said at least two insulation displacing connectors for push-pull motion between open and connected positions relative to said insulation displacing connectors,
   iv) means defining a passageway in said driver module for passing one or more such insulated wire conductors into said driver module and moving the wire conductors into and out of said insulation displacing connectors through said entry openings therein when said driver module is moved, respectively, to said connected and said open positions, and
   v) environmental sealant in said driver module for environmentally sealing said insulation displacing connectors in said driver module, and c) socket bridging means configured for electrically connecting said multi-pin socket to another such multi-pin socket on another such base frame.

22. The terminal of claim 21 wherein said environmental sealant is a gel.

23. The terminal of claim 21 wherein said tool-less wire termination module further comprises a small-gauge thimble capable of re-enterably manually terminating insulated wire conductors ranging from 22 to 24 gauge solid copper.

* * * * *